(No Model.) 2 Sheets—Sheet 1.

A. HARROLD & J. J. MAILS.
CORNSTALK HARVESTER.

No. 452,786. Patented May 26, 1891.

Witnesses
C. M. Hood.
J. F. Snyder

Inventors:
Aaron Harrold.
J. Jeffrey Mails.
By H. P. Hood
Attorney (No Model.) 2 Sheets—Sheet 2.
A. HARROLD & J. J. MAILS.
CORNSTALK HARVESTER.
No. 452,786. Patented May 26, 1891.
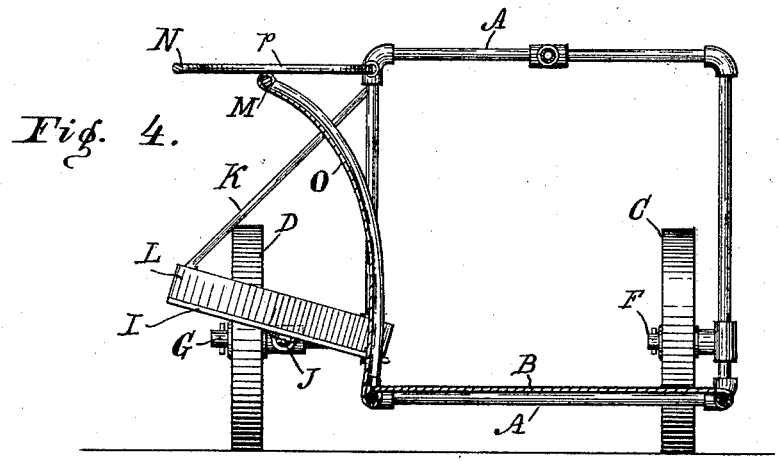
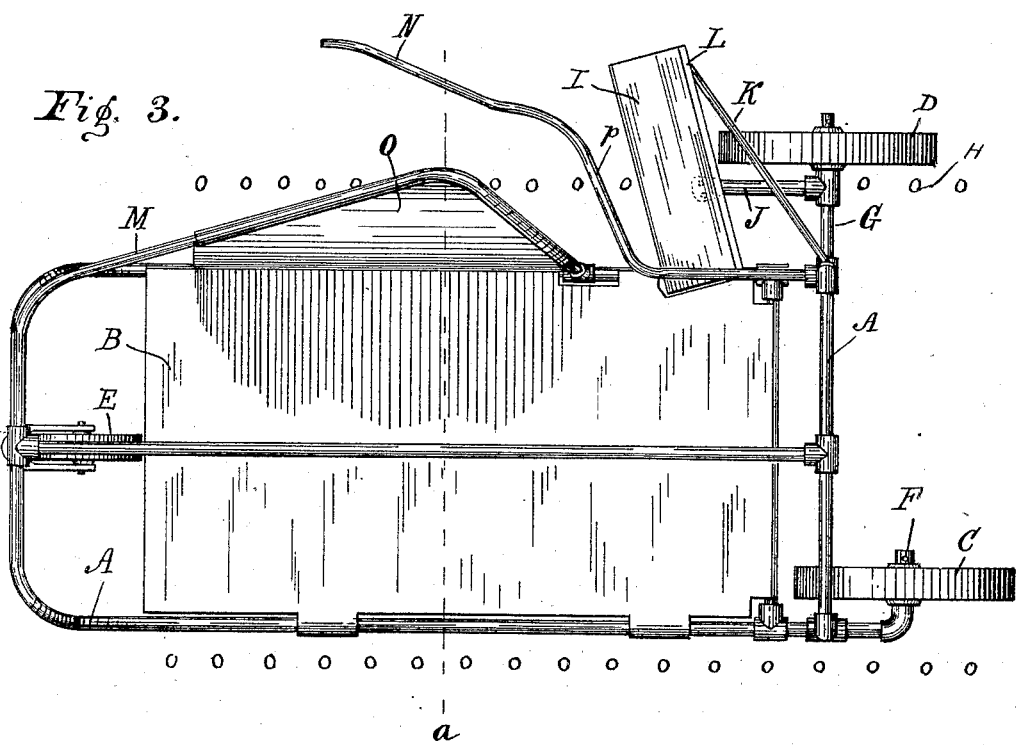

United States Patent Office.

AARON HARROLD AND JOHN JEFFREY MAILS, OF MANHATTAN, KANSAS.

CORNSTALK-HARVESTER.

SPECIFICATION forming part of Letters Patent No. 452,786, dated May 26, 1891.

Application filed November 12, 1890. Serial No. 371,173. (No model.)

*To all whom it may concern:*

Be it known that we, AARON HARROLD and JOHN JEFFREY MAILS, citizens of the United States, residing at Manhattan, in the county of Riley and State of Kansas, have invented a new and useful Improvement in Cornstalk-Harvesters, of which the following is a specification.

Our invention relates to an improvement in that class of machines for harvesting corn and other stalks in which a cutting-blade is secured in a fixed position upon a suitable vehicle adapted to receive and carry the cut stalks.

The objects of our improvement are, first, to provide a light low-running vehicle for carrying the knife and the cut stalks; second, to provide guides for the stalks which shall present the standing stalks to the knife in a bent or strained condition, thereby making them easier to cut, and which shall insure the falling of the cut stalks upon the platform of the carrier, and, third, to so construct and arrange the knife that it shall by its position and arrangement assist in the delivery of the cut stalks to the carrier and shall not be liable to become clogged, all as hereinafter fully described.

The accompanying drawings illustrate our invention.

Figure 2:
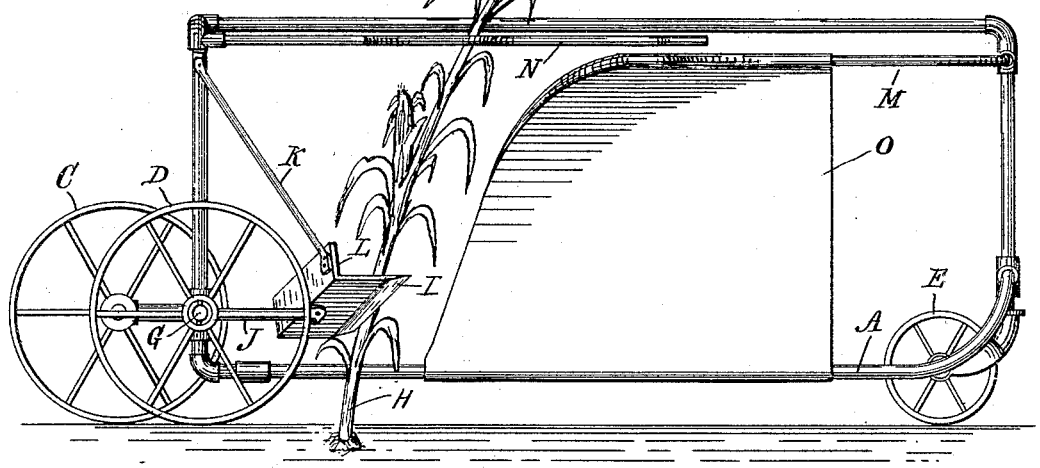
Figure 1:
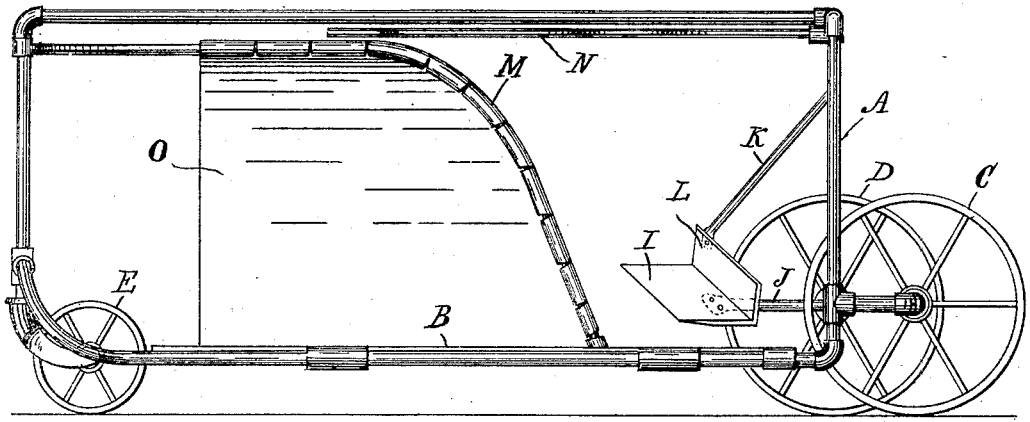

Figure 1 represents a side elevation; Fig. 2, an elevation of the side opposite that shown in Fig. 1; Fig. 3, a plan, and Fig. 4 a transverse vertical section, at $a$, Fig. 3.

The body of the machine consists of a light metallic frame A, formed, preferably, of gas or steam pipe and couplings, and a light platform B, which is hinged at one edge to one side of frame A, so as to swing thereon in a vertical plane.

The frame is mounted at the rear end upon a pair of carrying-wheels C and D and at the front end on a single caster-wheel E. Wheels B and C are mounted, respectively, on short axles F and G, which are attached to frame A above the platform B. Axle F projects inward, so as to bring the path of wheel C within the frame, and axle G projects outward, so as to bring the path of wheel D beyond the row of stalks H to be cut. The purpose of this arrangement of the carrying-wheels is to cause them to move in the furrows on each side of the row of stalks to be cut, and thus prevent lateral displacement of the machine.

At a point a little forward of wheel D a straight knife I is secured to frame A by suitable braces J and K, the arrangement being such that the inner end of the knife is about two inches above the platform B and the outer end of the knife projects outward from the frame of the machine and is inclined upward and forward, the purpose of this arrangement being to cause the knife to make a drawing cut and to cause the stalks to fall inward, their butts sliding inward along the knife by the force of gravitation. We regard the placing of the inner end of the knife above and clear of the platform and the upward inclination of the outer end of the knife as important, as by this means the clogging of the knife by the stalks at its inner end and the slipping outward of the cut stalks—difficulties heretofore encountered in this class of machines—are avoided.

For the purpose of preventing the cut stalks from sliding over the back edge of the knife that edge of the knife is provided with an upwardly-projecting vertical flange L, which may be formed integral with the knife or secured thereto in any suitable manner.

For the purpose of properly presenting the standing stalks to the knife two guides M and N are secured to the main frame A. Guide M consists of a bent bar or pipe secured at one end to the horizontal part of frame A at a point a short distance forward of the knife and rising from thence first inward and then outward and upward, so as to overhang the side of the frame, and then horizontally to the front upright of the frame, where the other end is secured. The space inclosed between guide M and the main frame is covered with sheet metal O, so as to present a smooth outer surface. Guide N consists of a rod or pipe attached at one end to the rear upright portion of frame A, and extending from thence forward and outward, being bent at $p$, so as to extend above and in front of the knife-edge and in a line nearly parallel therewith, and its unsupported end then extending obliquely forward.

In operation the machine is arranged so that the line of the row of stalks to be cut will pass between the carrying-wheel D and the side of frame A and wheel C will run in the furrow near the next row to the left. As the machine is drawn forward the stalks, passing between the guides M and N, are first bent outward by the guide M, and then, after passing the outward bend of the guide, come again to their normal position and are then engaged by that portion of guide N which is nearly parallel with the knife, and are thus bent forward and inward, as illustrated in Fig. 2, so that the knife comes in contact with the stalk while bent and the stalk is easily severed. The tops of the cut stalks being inclined inward and the butts being forced to slide inward by the inclined position of the knife, the stalks are deposited, without failure, on the platform B, from which they are discharged on the opposite side when enough have accumulated to form a shock by the operator raising the free edge of the platform.

We claim as our invention—

1. In a stalk-harvester, the combination of the main frame mounted on carrying-wheels, the platform mounted on said frame, and the fixed knife secured to the frame and projecting laterally therefrom, said knife having its inner end raised above the platform, so as to leave a clear space beneath the knife, and having its cutting-edge inclined from the inner end forward and upward, substantially as shown and described, and for the purpose set forth.

2. In a stalk-harvester, the combination, with the main frame and the cutting-knife mounted thereon, of the guide consisting of the bar M and sheet-metal covering C, arranged as shown and described, and guide N, bent at $p$ and arranged above and substantially parallel with the edge of the knife, as and for the purpose set forth.

AARON HARROLD.
J. JEFFREY MAILS.

Witnesses:
JNO. E. HESSIN,
GEO. S. MURPHY.